United States Patent [19]
Keegan et al.

[11] 3,868,260
[45] Feb. 25, 1975

[54] DENTURE ADHESIVE PREPARATION

[75] Inventors: James J. Keegan, Bloomfield; Howard Rubin, Rockaway, both of N.J.; Ram N. Gidwani, Edmonton, Alberta, Canada

[73] Assignee: Warner-Lambert Company, Morris Plains, N.J.

[22] Filed: June 5, 1974

[21] Appl. No.: 476,624

Related U.S. Application Data

[63] Continuation-in-part of Ser. No. 243,816, April 13, 1972, Pat. No. 3,833,518.

[52] U.S. Cl............................. 106/35, 260/DIG. 36
[51] Int. Cl.............................................. C08b 21/32
[58] Field of Search................ 260/DIG. 36, 9, 231; 106/35

[56] References Cited
UNITED STATES PATENTS

| | | | |
|---|---|---|---|
| 2,997,399 | 8/1961 | Eberhard et al. | 106/35 |
| 3,003,988 | 10/1961 | Germann et al. | 106/35 X |
| 3,336,269 | 8/1967 | Monagle et al. | 260/79.3 MU |
| 3,511,791 | 5/1970 | Puetzer et al. | 106/35 X |
| 3,736,274 | 5/1973 | Schoenholz et al. | 260/17 R |

*Primary Examiner*—Melvin Goldstein
*Assistant Examiner*—W. C. Danison
*Attorney, Agent, or Firm*—Albert H. Graddis; Frank S. Chow; Anne M. Kelly

[57] ABSTRACT

An improved anhydrous denture adhesive is prepared to contain a mixture of a cationic polymeric material and a natural anionic gum material as the adhesive ingredient. The mixture may be formulated as a powder or anhydrous paste, which, when applied to dentures and exposed to moisture, develops superior adhesive properties. Suitable cationic materials include at least one O-lower alkyl-trimethylammonium chloride-substituted-anhydroglucose polymer. As the anionic component there may be used at least one natural gum, such as gum karaya, gum arabic, gum Shiraz, gum tragacanth, pectin, pectinates, algin, and alginates.

8 Claims, No Drawings

DENTURE ADHESIVE PREPARATION

CROSS REFERENCE TO RELATED APPLICATION

This application is a continuation-in-part of U.S. Ser. No. 243,816, filed Apr. 13, 1972, now U.S. Pat. No. 3,833,518.

BACKGROUND OF THE INVENTION

Traditionally, adherent powders used to secure dentures within the mouth were prepared from such materials as finely powdered natural gums, i.e., karaya, acacia or tragacanth gum. These materials have the particular property of swelling to many times their original volume upon the addition of water to form a gelatinous or mucilaginous mass. Denture adhesive powders may be a combination of one or more natural gums, generally flavored with pleasant tasting volatile oils. Many other additives may also be included, such as antiseptics, stablizers, bactericides, special deodorants, plasticizing agents, fillers, coloring agents, and the like.

Cream forms of the denture adherent, prepared from finely ground particles of the natural gums dispersed in a cream base, are also available and may be used instead of the powder compositions. In any event, when wet with water, the natural gum in either the cream or powder formulation, expands to become a viscous gel which acts as a cushion and an adherent between the denture plate and the gum tissue.

While these relatively simple formulations are effective in securing dentures within the oral cavity for a short period of time, generally more than one application of the adhesive per day is necessary. This is, at best, inconvenient and therefore, most undesirable.

In recent years, there have been numerous improvements in the above described simple denture adhesive formulations. For example, in U.S. Pat. No. 3,003,988, a water insoluble, water-sensitized copolymer is disclosed as the adhesive or stabilizing component of a denture composition. Actually, this patent discloses mixed, partial salts of copolymers of maleic anhydride with lower alkyl-vinyl-ethers, and partial esters of these salts, as the adhesive material. For example, the calcium-sodium partial salts of a partial isopropyl ester of methyl vinyl ether/maleic anhydride copolymer is said to provide a superior denture adhesive.

In U.S. Pat. No. 2,997,399, the principal ingredient of the denture adhesive is a hydroxyethyl cellulose having a certain degree of substitution of ethylene oxide groups per anhydro-glucose unit of the cellulose molecule; preferably, there is also present a lower alkyl ether of cellulose, such as methylether of cellulose, exhibiting temperature-dependent viscosity properties, i.e., showing an increase in viscosity with an increase in temperature. As an optional ingredient in the denture adhesive of U.S. Pat. No. 2,997,399, there may be used a polyacrylamide. This optional ingredient is said to produce an improved "feel," "texture," or "body" in the denture adhesive.

U.S. Pat. No. 3,440,065 discloses still another denture adhesive wherein a powdered, insoluble absorptive cellulose material, such as alpha cellulose, wood flour or microcrystalline cellulose, is incorporated into a gum petrolatum base adhesive. As the gum in the adhesive, sodium carboxymethyl cellulose, hydroxyethyl cellulose, karaya gum, guar gum, tragacanth and mixtures thereof are suggested.

Another improvement over conventional denture adhesives is claimed in U.S. Pat. No. 3,511,791, which teaches that copolymers of acrylamide and acrylic acid, or homopolymers of acrylamide can form the principle adhesive component in a denture adherent to provide sustained adherence in use without swelling. Whenever a homopolymer of acrylamide, which is nonionic in character, is used, gum karaya is added to the formulation in order to provide a synergistic improvement in gel strength and adhesiveness.

Further, U.S. Pat. No. 3,575,915 discloses a superior denture adhesive containing polyvinyl acetate, water, ethanol, a mineral hydrocolloid, such as colloidal silicate, and a plasticizer.

U.S. Pat. No. 2,978,812 discloses the addition of ethylene oxide homopolymers to denture adhesive gums, including cellulose derivatives, to improve adhesive qualities.

U.S. Pat. No. 3,736,274 discloses a denture adhesive containing three essential ingredients: a maleic anhydride and/or acid copolymer (with a lower alkyl vinyl ether), a polymeric N-vinyl lactam, and sodium carboxymethyl cellulose.

While all of the above denture adhesives provide some improvement over simple formulations containing only finely powdered natural gums, it is generally recognized that no one product has yet been developed which can accommodate, over a long period of time, the many variations in temperatures, pH and mechanical agitation which are quite normal in the oral cavity.

It has now been found that the denture adhesive of this invention will provide superior adherent properties over prolonged periods of time and under unusually varied conditions, without the disadvantages characteristic of previously known products.

SUMMARY OF THE INVENTION

An anhydrous denture adhesive comprises a mixture of a cationic polymeric component and an anionic natural gum component which, when applied to dentures and exposed to moisture, develops adhesive properties. Suitable cationic materials include at least one 0-lower alkyl-trimethylammonium chloride-substituted-anhydro-glucose polymer. As the anionic component there may be used at least one natural gum, such as gum karaya, gum arabic, gum Shiraz, gum tragacanth, pectin, pectinates, algin and alginates. In the preferred products of the invention, the anionic component is gum arabic.

DESCRIPTION OF THE INVENTION

This invention relates to an anhydrous denture adhesive, which, when in contact with moistened denture plates and the saliva, hydrates within the oral cavity to provide superior adherent properties. The principal adhesive force develops when the mixture of the anhydrous cationic polymeric component and the anhydrous anionic gum material is exposed to moisture.

The cationic polymeric component suitable for use in the practice of this invention is at least one 0-lower alkyl-trimethyl-ammonium chloride-substituted-anhydroglucose polymer described generally in U.S. Pat. No. 3,472,480 as having the formula:

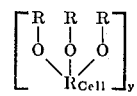

wherein $R_{cell}$ is the residue of an anhydroglucose unit, y is an integer having a value of from about 50 to about 20,000, and each R individually represents a substituent group of the general formula:

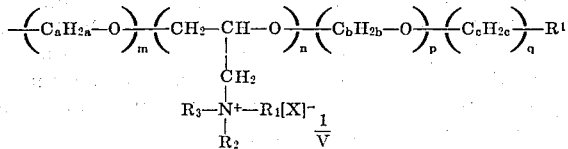

wherein:
a is an integer having a value of from 2 to 3;
b is an integer having a value of from 2 to 3;
c is an integer having a value of from 1 to 3;
m is an integer having a value of from zero to 10;
n is an integer having a value of from zero to 3;
p is an integer having a value of from zero to 10;
q is an integer having a value of from zero to 1;
R' is a member selected from the group consisting of

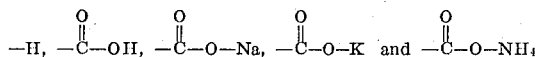

with the proviso that when q is zero then R' is —H;
$R_1$, $R_2$ and $R_3$, taken individually, represent a member selected from the group consisting of alkyl, aryl, aralkyl, alkaryl, cycloalkyl, alkoxyalkyl and alkoxyaryl radicals where each of $R_1$, $R_2$ and $R_3$ can contain up to 10 carbon atoms, with the proviso that when said member is an alkoxyalkyl radical there are at least two carbon atoms separating the oxygen atom from the nitrogen atom, and with the further proviso that the total number of carbon atoms in radicals represented by $R_1$, $R_2$ and $R_3$ is from 3 to 12 with the further proviso that when $R_1$, $R_2$ and $R_3$ are taken together the nitrogen atom to which $R_1$, $R_2$ and $R_3$ are attached can be a component of a heterocyclic ring selected from the group consisting of pyridine, α-methylpyridine, 2,5-dimethylpyridine, 2,4,6-trimethylpyridine, N-methylpiperidine, N-ethyl piperidine, N-methyl morpholine and N-ethyl morpholine; X is an anion; V is an integer which is equal to the valence of X; the average value of n per anhydroglucose unit of said cellulose ether is from about 0.01 to about 1; and the average value of m+p+q per anhydroglucose unit of said cellulose ether is from about 0.01 to about 4.

In the aforementioned formula for the cationic polymer, preferred cationic polymers for use in the denture adhesive of this invention are obtained when y is an integer having a value of from about 1,000 to about 5,000 and each R individually represents a substituent group of the general formula:

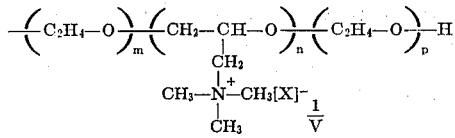

wherein:
m is an integer having a value of from zero to 10;
n is an integer having a value of from zero to 3;
p is an integer having a value of from zero to 10;
X is an anion; V is an integer which is equal to the valence of X; the average value of n per anhydroglucose unit of the cellulose ether is from 0.01 to 1; and the average value of m+p per anhydroglucose unit of the cellulose ether is from 0.01 to 4.

Expecially preferred cationic polymers are those in which X is chlorine, the average value of n per anhydroglucose unit of the cellulose ether is from 0.1 to 0.5, and the average value of m+p per anhydroglucose unit of the cellulose ether is from 0.1 to 2.5. A particularly preferred 0-alkyl-trimethylammonium chloride-substituted-anhydroglucose polymer of this type of commercially available as Polymer JR-400 from Union Carbide Corporation, New York, N.Y. Polymer JR-400 is water soluble and, at a concentration of 1 percent and a temperature of 25°C, yields a solution having a viscosity of 400 centipoises.

As the anionic ingredient of the denture adhesive of this invention, there may be used one or more gums of the natural variety selected from the group gum karaya, gum arabic, gum Shiraz (gum ghatti), gum tragacnath, pectin and salts thereof (pectinates), algin and salts thereof (alginates), and the like, which are anionic in character.

Among the suitable anionic materials described above, one or more of the following gums have been found to be especially effective in the denture adhesive of this invention: gum karaya, gum arabic and gum Shiraz. Gum arabic is particularly preferred.

The denture adhesive of this invention may be formulated to contain the cationic polymer and the anionic gum in either powder or paste form. In the powder formulation, the two anhydrous, particulate, components are admixed with the usual flavors and colorants in the following proportions: for the cationic polymer, from 1 to 80 percent, preferably from 3 to 50 percent by weight, based on the weight of the total formulation is suitable; for the anion source, from 20 to 99 percent, preferably from 30 to 90 percent, by weight, based on the weight of the total formulation may be used. Other ingredients such as non-toxic anti-caking agents, (silica, magnesium stearate, talcum powder or the like) may also be included. The mixture of ingredients is thoroughly agitated or stirred to yield a generally homogenous intermixing of all components.

In the paste formulations, the cationic polymer and the anionic gum are admixed with petrolatum, mineral, animal or vegetable oils, and the like, along with flavors, colorants and certain commonly used preservatives and fillers.

A particularly preferred paste or cream formulation is prepared by utilizing as the cream or paste base, the product of U.S. Pat. No. 3,215,599. The cream or paste base of this patent is characterized as a mixture of white petroleum oil with a minor amount of a polyethylene wax having an average molecular weight of 1,000 to 20,000. This product is described as having emollient properties, useful in the formulation of medicaments where absorption of the medicament by the skin is of paramount importance. Denture adhesive creams formulated with this petroleum oil/polyethylene wax blend as the paste or cream base display unusually good stability, extrudability and product appearance. The successful use of a "cosmetic" or "medicinal" vehicle in the denture adhesive of the invention, to provide a cream formulation of improved properties is most unexpected.

Concentrations of ingredients in a cream or paste denture adhesive are as follows: for the cationic polymer, from 1 to 40 percent, preferably 5 to 25 percent by weight based on the weight of the total formulation; for the anion source, from 15 to 50 percent, preferably 25 to 40 percent by weight based on the weight of the total formulation; and for the cream base, from 30 to 65 percent, preferably 40 to 60 percent by weight, based on the weight of the total formulation. In the aforementioned particularly preferred cream formulation utilizing the petroleum oil with polyethylene wax blend of U.S. Pat. No. 3,215,599, the petroleum oil and the polyethylene wax are used in amounts of from 3 to 20 percent, preferably 5 to 15 percent of polyethylene wax and 80 to 97 percent, preferably 85 to 95 percent by weight of petroleum oil, based on the total weight of the cream or paste base in the denture adhesive formulation.

Whether formulated as a powder or paste, the denture adhesive mixture of this invention, when applied to dentures and exposed to moisture, hydrates to form an adhesive combination markedly superior to prior art, preformed adhesive materials.

In order to further illustrate this invention, the following examples are given:

EXAMPLE 1

Preparation of Denture Adhesive Cream

A. Weigh 40.75 pounds of heavy mineral oil into a steam-jacketed Hobart mixer and heat to 90°C. At 90°C, add 4.0 pounds of a polyethylene wax of average molecular weight 2,000, and disperse the wax thoroughly in the mineral oil while force cooling the batch to 70°C during mixing. At 70°C, add 0.10 pounds of methyl paraben and 0.15 pounds of propyl paraben, and mix well, while force cooling the batch to 45°C.

B. In a Hobart mixer, add 9 pounds of Polymer JR; 21.0 pounds of gum acacia (100 mesh, sterilized); 25.0 pounds of gum Shiraz (100 mesh, sterilized); and 0.125 pounds of FD and C Red No. 3 Lakolene (19 percent pure dye); mix these dry ingredients until complete blending is achieved. At 45°C, add B to A and mix for about 15 minutes with the Hobart blades.

C. Add 0.10 pounds of peppermint oil, U.S.P. to the mixture of A and B and mix until a homogeneous cream is obtained.

EXAMPLE 2

Preparation of a Denture Adhesive Cream

A. Into a steam-jacketed Hobart mixer, add 49.75 pounds of petrolatum and heat to 70°C. At 70°C, add 0.10 pounds of methyl paraben and 0.15 pounds of propyl paraben and mix well, while force cooling the batch to 45°C.

B. In a Hobart mixer, add 25.0 pounds of gum karaya (100 mesh, sterilized); 13 pounds of pectin (100 mesh, sterilized); 12 pounds of Polymer JR; and 0.0125 pounds of F.D. & C. Red No. 3, Lakolene (19 percent pure dye) and mix these dry ingredients until complete blending is achieved. Add B to A, at 45°C and mix for 15 minutes with the Hobart blades.

C. Add 0.10 pounds of peppermint oil, U.S.P. to the mixture of A and B, and mix until a homogeneous cream is obtained. Continue mixing until the batch reaches a temperature of 25°C.

EXAMPLE 3

Preparation of Denture Adhesive Powder

A denture adhesive powder is prepared to contain the following ingredients:

| | |
|---|---|
| Polymer JR | 5.0 pounds |
| Gum Acacia | 70 pounds |
| Gum Karaya | 25 pounds |
| Peppermint Oil | 0.1 pound |

The peppermint oil is well dispersed in about 25 pounds of the gum acacia.

The premix is then added to the balance of the gum acacia which has previously been placed in a ribbon blender mixing apparatus. The whole is then mixed for about 15 minutes, after which the remaining ingredients are added and the batch mixed for an additional 15 minutes.

EXAMPLE 4

Preparation of Denture Adhesive Powder

A denture adhesive powder is prepared, according to the procedure of Example 3, from the following ingredients:

| | |
|---|---|
| Polymer JR | 8 pounds |
| Gum Tragacanth | 40 pounds |
| Pectin | 52 pounds |
| Anise Oil | 0.1 pound |

EXAMPLE 5

Preparation of Denture Adhesive Powder

A denture adhesive powder is prepared, according to the procedure of Example 3, from the following ingredients:

| | |
|---|---|
| Polymer JR | 100 pounds |
| Gum Acacia | 891 pounds |
| Anise Oil | 1 pound |

We claim:

1. A denture adhesive comprising a substantially anhydrous mixture of:

A. from about 1.0 to about 80 percent by weight, based on the total weight of the denture adhesive, of at least one cationic polymeric material having the formula:

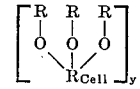

wherein $R_{Cell}$ is the residue of an anhydroglucose unit, $y$ is an integer having a value of from about 1,000 to about 5,000, and each R individually represents a substituent group of the general formula:

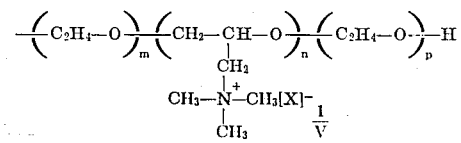

wherein:
  $m$ is an integer having a value of from zero to 10;
  $n$ is an integer having a value of from zero to 3;
  $p$ is an integer having a value of from zero to 10;
  X is an anion; V is an integer which is equal to the valence of X; the average value of $n$ per anhydroglucose unit of said cellulose ether is from about 0.01 to about 1; and the average value of $m+p$ per anhydroglucose unit of said cellulose ether is from about 0.01 to about 4; and B. from about 20 to about 99 percent by weight, based on the total weight of the denture adhesive, of at least one anionic gum selected from the group consisting of gum karaya, gum arabic, gum Shiraz, gum tragacanth, pectin, pectinates, algin and alginates.

2. A denture adhesive according to claim 1 wherein, in the cationic polymeric material of (A) X is chlorine, the average value of n per anhydroglucose unit of said cellulose ether is from about 0.1 to about 0.5, and the average value of $m+p$ per anhydroglucose unit of said cellulose ether is from about 0.1 to about 2.5.

3. A denture adhesive according to claim 2 comprising a substantially anhydrous mixture of from about 3.0 to about 50 percent by weight of the cationic polymeric material, and from about 30 to about 90 percent by weight of the anionic gum.

4. A denture adhesive according to claim 3 wherein the anionic gum is selected from the group consisting of gum karaya, gum arabic and gum Shiraz.

5. A denture adhesive according to claim 4 wherein the anionic gum is gum arabic.

6. A denture adhesive according to claim 1 which additionally contains from about 10 to about 75 percent by weight, based on the weight of the total denture adhesive compositions of non-toxic, powdered, excipient materials.

7. A denture adhesive according to claim 1 which additionally contains from about 30 to about 75 percent by weight, based on the weight of the total denture adhesive composition of at least one cream base material selected from the group consisting of petrolatum, natural and synthetic oils.

8. A denture adhesive according to claim 1 which additionally contains from about 30 to about 75 percent by weight, based on the weight of the total denture adhesive composition, of a cream base material which is a combination of mineral oil with a minor amount of a polyethylene wax having a molecular weight of 1,000 to 20,000.

* * * * *